United States Patent
Herring

[11] 3,710,246
[45] Jan. 9, 1973

[54] AUTOMOBILE TIMER

[76] Inventor: Carl E. Herring, Santa Monica, Calif. 90403

[22] Filed: June 22, 1970

[21] Appl. No.: 48,282

[52] U.S. Cl. ..................324/162, 324/174, 324/179, 235/92

[51] Int. Cl. ............................................G01p 3/42

[58] Field of Search............324/158 MG, 160, 162, 178–180, 324/186, 174; 235/42 A, 92 T, 104, 150.2, 151.32; 58/39.5, 152 E, 145; 73/514, 518, 519; 340/262, 263

[56] References Cited

UNITED STATES PATENTS

| | | | |
|---|---|---|---|
| 3,530,382 | 9/1970 | Liston | 324/178 |
| 3,182,498 | 5/1965 | Koletsky | 324/174 |
| 3,125,884 | 3/1964 | Davies | 324/162 |
| 3,169,185 | 2/1965 | Nines | 324/171 |
| 3,331,200 | 7/1967 | Byron | 58/145 |
| 3,560,854 | 2/1971 | Moss | 324/174 |

OTHER PUBLICATIONS

E. Bukstein–Industrial Electronics Measurement and Control–publ. Bobs Merrill & Co. Inc. 9/61 – pp. 63–73.

Primary Examiner—Michael J. Lynch
Attorney—George J. Netter and Kendrick and Subkow

[57] ABSTRACT

Magnet markers are secured to a vehicle front wheel, and immediately adjacent thereto, secured to the body of the vehicle, there is located a coil sensor. Signals induced in the sensing coil are shaped and fed into an $n$-stage binary counter. The decoded binary counter output conditions switching logic which interrelates a clock pulse generator and a counter having digital display. Three modes of operation are provided: elapsed time for a quarter mile; acceleration time over a predetermined speed range; and acceleration time from a standing start to a given speed.

The present application pertains to apparatus for making velocity-time measurements, and, more particularly, to apparatus for use with wheeled vehicles to measure time extent between selective vehicle velocities and for predetermined distances of travel.

6 Claims, 4 Drawing Figures

PATENTED JAN 9 1973 3,710,246
SHEET 1 OF 2
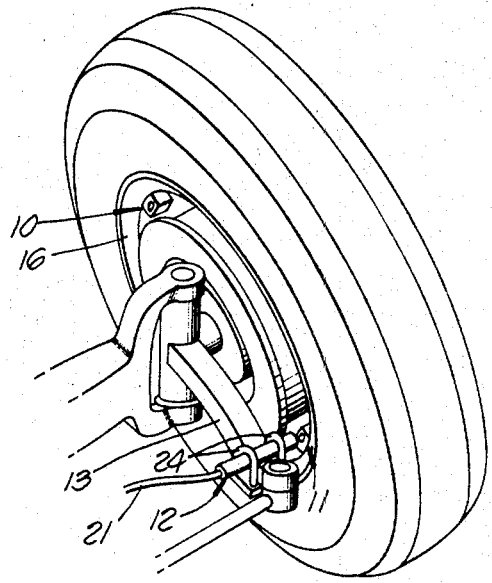
FIG. 1.
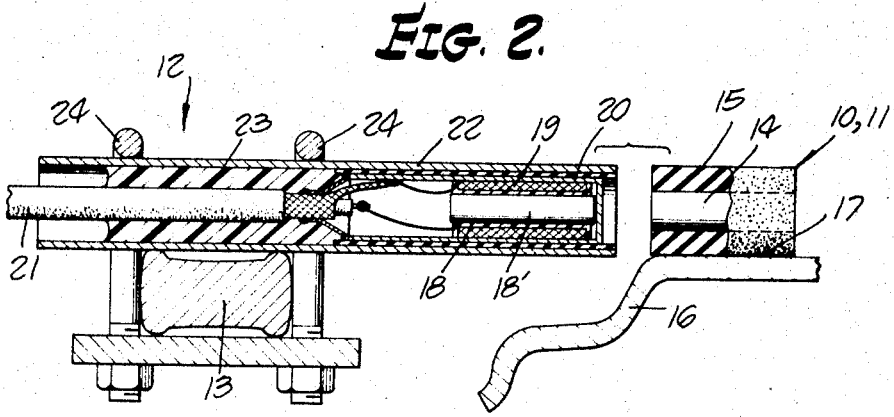
FIG. 2.
|  | BELOW 60 MPH | ABOVE 60 MPH |
|---|---|---|
| SCHMITT TRIGGER OUTPUT | ⎍⎍⎍⎍ | ⎍⎍⎍⎍⎍ |
| ×1 BINARY (A) | | |
| ONE SHOT MV (B) | | |
| NAND OUTPUT (ĀB̄) | | |
FIG. 4.
INVENTOR.
CARL E. HERRING
BY KENDRICK and SUBKOW
George J. Netter
ATTORNEYS

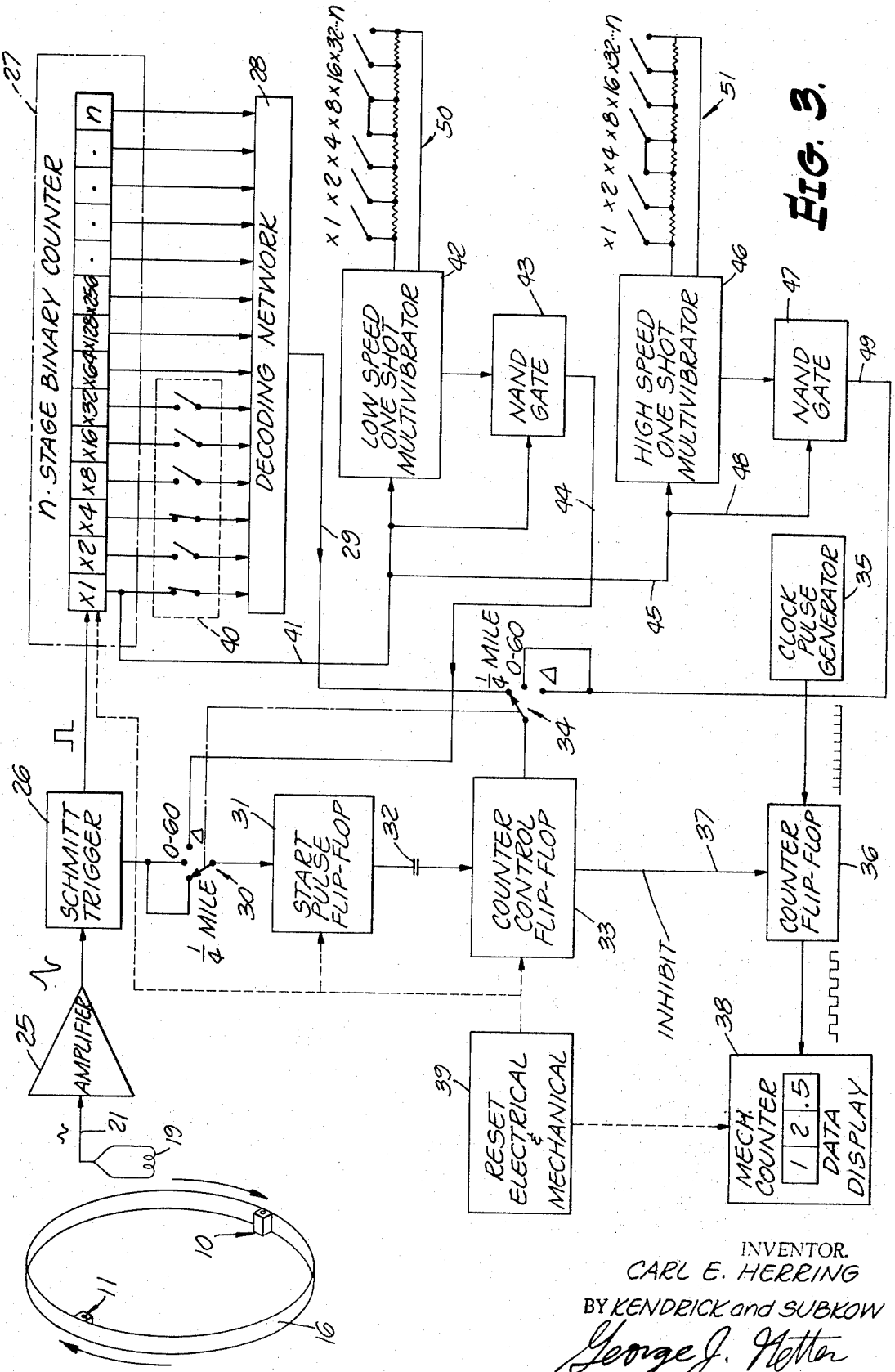

AUTOMOBILE TIMER

BACKGROUND OF THE INVENTION

In testing and recreational racing of automotive vehicles, it is frequently desirable to determine, within precise limits, the time it takes a vehicle to negotiate a particular distance, or the time required to accelerate to a predetermined velocity from a standing start, or the time to accelerate from a given lower velocity to some higher one, For example, in so-called drag-strip racing, a favorite stock car race is that of negotiating a straightaway, quarter-mile track. More particularly, the cars engaged in the quarter mile races do not race against one another, but against the clock, with that car having the lowest measured time for the quarter mile winning. In certain performance tests as well as in racing, it is desirable to be able to measure acceleration time required for the auto to go from, say, zero miles per hour to 60 miles per hour, or from 25 to 70 miles per hour.

In the case of the quarter-mile drag race, the standard approach in the past has been to provide apparatus external of the vehicle at the track or raceway which measures the passage of the automobile between select points. More particularly, a photoelectric system located at points corresponding to the start and finish positions, automatically start and stop a clock mechanism for measuring elapsed time of the vehicle passing along the course.

Acceleration measurement has required more complex equipment, relying in certain cases on photoelectric actuation by the speedometer indicator on reaching a predetermined speed.

OBJECTS AND SUMMARY OF THE INVENTION

It is therefore a primary aim and object of this invention to provide digital electrical apparatus carried by a vehicle which provides an accurate time extent for traversing a predetermined distance.

A further object of the invention is the provision of apparatus for providing the time extent for a vehicle to accelerate from a first velocity to a second velocity.

In the practice of the present invention, permanent magnet markers are secured to one of the front wheels or a fifth wheel of a vehicle and immediately adjacent thereto, secured to the body of the vehicle, there is located a coil sensor. Rotation of the wheel induces a voltage signal in the coil each time a magnet marker passes the coil. The signal from the sensing coil is shaped into a square wave pulse which is, in turn, fed into the input of an $n$-stage binary counter. The decoded output of the binary counter conditions switching logic which interrelate a clock pulse generator and a counter having digital display.

In measuring the time extent for traversal of a prescribed distance, the counter, display and binary counter are initially reset. The first signal induced into the sensor coil conditions the switching logic to initiate counting of clock pulses while simultaneously actuating the binary counter. When the vehicle wheel has rotated that number of times corresponding to the prescribed distance, the binary counter decoder generates a signal which inhibits the logic and thereby stops the counter. The displayed value is calibrated to represent the vehicle time for traversing the prescribed distance, e.g., one-quarter mile.

When the equipment is switched to acceleration measuring mode from a standing start (e.g., 0–60 mph). the first signal induced in the sensor starts the clock pulse counting and is fed into the binary counter. The width of the output signal from the first stage of the binary counter is compared with a reference signal of width corresponding to the desired reference velocity. When the two signals are compared and found to have the same width, the logic is inhibited, stopping clock pulse counting.

In the further acceleration measuring mode between two prescribed velocities or $\Delta$ mode (e.g., 25–70 mph), a first signal induced in the sensor is fed into the binary counter and the binary counter first stage output signal width is compared with a first reference signal pulse having a width corresponding to the desired low vehicle speed. On comparison, clock pulse counting is initiated. The first stage output is also compared with a second reference signal pulse having a width corresponding to the prescribed vehicle high speed. On comparison of the latter two pulses, the logic is inhibited, stopping clock pulse counting. The displayed time represents the time elapsed for the vehicle to accelerate from the low speed to the high speed.

DESCRIPTION OF A PREFERRED EMBODIMENT

A fundamental principle of operation of the present invention is to count the revolutions that one of the vehicle wheels makes, with the elapsed time for a predeterminable number of wheel revolutions corresponding to the desired race distance, e.g., one-quarter mile, being rendered to a digital processing system. In another mode of operation, the system is selectively actuatable to measure the elapsed time from initiation of movement of the vehicle to a predetermined rate of wheel revolution corresponding to a given vehicle speed, e.g., the time to accelerate from 0–60 mph. A still further mode is the measurement of elapsed time for the vehicle to accelerate from one predetermined speed to another, e.g., 25–70 mph.

With reference now to FIG. 1, a pair of magnetic markers 10 and 11 are fixedly mounted to the inside rim surface of one of the front wheels, or alternatively, to a fifth wheel, at diametrically opposed points. It is advisable to mount the markers on the front vehicle wheels, or fifth wheel, rather than a powered rear wheel to obviate errors from wheel slippage during rapid accelerations. A magnetic sensor 12, secured to the steering arm 13 associated with the wheel carrying the markers 10 and 11 is so situated as to be actuated each time a marker moves therepast.

Turning to FIG. 2, each magnetic marker 10, 11 includes a cylindrical permanent magnet 14 embedded within a rectangular body 15 of pliable, flexible, low magnetic permeability material, such as rubber, for example. The markers are secured to the wheel rim 16 by a cementitious material 17 and in such orientation as to align the magnet long dimension substantially parallel to the wheel axle.

The sensor 12 comprises a bobbin 18 encompassing a soft iron core 18' and about which is wound a multiturn helical coil 19. The wound bobbin is contained within a non-magnetic metal canister 20 that completely encompasses the bobbin except for the entrance opening which is necked down about a coaxial cable 21 connected to the coil. The canister and a short length of the connecting cable are encapsulated in and insulated from a non-magnetic hollow cylindrical metal tube 22 as at 23. The entire sensor assembly can be secured to the steering arm 13 by a pair of U-bolts 24, for example.

With reference now particularly to FIG. 3 and the electrical circuit aspects of this invention, the signals induced in the sensor coil 19 by passage of the marker magnets 10, 11 are amplified in amplifier 25 and actuate a square wave generator 26, such as a Schmitt trigger, for example. The square wave pulses from 26 are fed to the input of an $n$-stage binary counter 27, the respective outputs of each stage being connected to a selectively adjustable decoding network 28.

Specifically, the counter 27 is a binary up counter which produces signal outputs at those counter stages corresponding binarily to the accumulated number of actuating pulses presented to the counter input. The number of stages in the binary counter must be sufficient to accommodate the highest pulse count to be expected. For example, it can be shown that for a wheel diameter of 2.0 feet and two marker magnets, a nine-stage binary counter is required to accommodate the 420 expected count for one-fourth of a mile travel by the vehicle. Such counters are well known in the switching circuit art and a detailed description in this regard is, therefore, not given.

The decoding network 28 is adjustable to provide a pulse signal on line 29 for a purpose to be described later herein for any preselected accumulated value in the counter 27. Such decoding networks are also well known in the switching circuit art, and no further details are deemed necessary for understanding the present invention.

A second output from the square wave generator 26 is fed through a single-pole, triple-throw switch 30 when it is in the ¼-MILE position to the set terminal of start pulse flip-flop 31. The set output of 31 is connected via a differentiating network 32 to the set input terminal of a counter control flip-flop 33, with the reset input terminal of 33 being connected through a single-pole, triple-throw switch 34 to the decoding network output lead 29 when this switch is in the ¼-MILE position. The switches 30 and 34 are ganged for common actuation to the ¼-MILE, 0–60 mph and Δ-modes.

A continuously running clock pulse generator 35 actuates a counter flip-flop 36, when it is not inhibited via lead 37, to produce a corresponding square-wave pulse train for energizing a mechanical counter and data display 38. Any of several commercially available digital display devices may be used here, such as, for example, the cold cathode gas discharge tube type and those utilizing segmented incandescent filaments.

Manual reset capability is schematically shown as at 39 for the mechanical counter and data display, flip-flops 31 and 33, and the binary counter 27.

Before proceeding with the description of the remainder of the electrical circuit apparatus, it is instructive to examine operation of the equipment described to this point for determining the time for traversing a one-quarter mile distance. Initial calibration of the equipment requires a precise measurement of the effective vehicle wheel circumference in order to set the exact number of pulses that will set up in the binary counter during a quarter mile run. For example, if the effective wheel diameter is exactly 2 feet, then the wheel will make very close to 210 full revolutions in one-quarter of a mile, and, since two signals are induced in the sensor coil 19 for each such wheel revolution, there will be presented 420 square wave counting pulses to the binary counter. The decoding network would accordingly be adjusted to provide an output on 29 on accumulation of the decimal count "420" in the binary counter.

Although once it has been determined for a given vehicle what the "count" is for one-quarter of a mile, e.g., 420, it can vary to a minor extent because of such things as tire wear, change in tire inflation, and ambient temperature variation, among other things. In order to provide calibration adjustment for these relatively small predictable variations, the set of switches 40 are individually actuatable to selectively disconnect any or all of typically the first six stages of the binary counter, thereby providing a corresponding micro adjustment of the readout from the decoding network 28.

In use of the equipment for measuring the elapsed time for one-quarter mile, assume the decoding network has been calibrated to correspond to the actual effective wheel diameter as described in the preceding paragraph. The switches 30, 34 are set to the ¼-MILE mode and the manual reset 39 is actuated. As the vehicle moves, induced signals in the coil 19 are converted to an equivalent number of square wave pulses which are counted in the binary counter 27. At the same time, the pulse output of 26 is fed through the switch 30, setting the flip-flop 31 output which, in turn, via the differentiating network 32, sets the output of flip-flop 33. With the flip-flop 33 set output up, i.e., inhibit lead 37 in the down condition, the counter flip-flop 36 is actuated by each pulse from the clock pulse generator 35 to initiate the mechanical counter and display 38. On receipt of the allotted number of pulses in the binary counter for a quarter mile, the decoding network provides a signal through switch 34 to reset the flip-flop 33, thereby inhibiting the counter flip-flop 36 and stopping the mechanical counter and data display from receiving further information. Accordingly, the apparatus 38 displays the time required for the vehicle to cover the quarter mile distance.

It is instructive at this point to examine the operation of the start pulse flip-flop 31 and differentiating network 32. The flip-flop 31 is set by first or start signal sensed by the coil 19 and the flip-flop output is then differentiated by 32 to give a single pulse for setting flip-flop 33 as has been described. Flip-flop 31 cannot be set again by further pulses from the trigger 26 until reset by the means 39. This prevents releasing the inhibit on counter flip-flop 36 (thereby again initiating counting) on the next pulse after the predetermined pulse count has stopped the counting. That is, in the case of a "420" count quarter mile, flip-flop 31 and differentiating network 32 do not set flip-flop 33 on the "420 + 1" pulse count which would produce an error in the displayed time.

Turning now to determination of elapsed time for a vehicle to go from a specified lower speed to some prescribed upper speed, the switches 30 and 34 are transferred to the Δ position. As to the additional circuitry used in this mode, the binary counter first stage (X1) output is connected by lead 41 to a one-shot multivibrator 42, also identified as low speed one-shot multivibrator. The multivibrator 42 output serves as one input to a NAND-gate 43, the other input of which is the binary counter first stage signal. The NAND-gate is a well known switching circuit which provides an output signal when all of its input connections are down, or in Boolean terms, where A and B are the input signals, $\overline{AB}$. The NAND-gate signal is connected via lead 44 to the $\Delta$ point of switch 30.

Similarly, the binary counter first stage is connected through leads 41 and 45 to the input of a high-speed, one-shot multivibrator 46. A further NAND-gate 47, which can be identical to gate 43, is connected to receive signals from the binary counter first stage through lead 48 and from the multivibrator 46. NAND-gate 47 output interconnects with the fixed 0–60 and $\Delta$ points of switch 34 by lead 49.

The multivibrators 42 and 46 are provided with individual calibration means 50 and 51, respectively. The same factors mentioned previously with regard to the ¼ MILE mode are considered when making a proper adjustment. Each such means including a plurality of resistors with individually actuatable shorting switches, the resistive circuit being interconnected with the associated multivibrator to control the output pulse width in accordance with the magnitude of the electrical resistance, and for convenience weighted in binary form $(X1, X2, \ldots)$ as shown.

As depicted in FIG. 4, the width of the pulse output of binary counter X1 stage is determined by the speed of the wheel, i.e., decreases in width as the wheel speed increases. The multivibrator 42 is adjusted to provide a square wave pulse of width corresponding to the low speed or threshold speed from which acceleration is to be measured, e.g., 25 mph. As long as the vehicle speed is less than the prescribed threshold speed NAND-gate 43 does not have an output. However, when the wheel speed exceeds the threshold speed, the pulse width from the X1 stage of the counter is less than the reference pulse width from 42 satisfying the Boolean conditions for actuating gate 43. A signal is now available through switch 30 to initiate clock pulse counting and display at 38 as described before in connection with ¼-MILE mode operation.

A second one-shot multivibrator 46, also identified as the high speed multivibrator, is actuated by the binary counter X1 stage output via leads 41 and 45. A further NAND-gate 47 is fed by the multivibrator 46 pulse output and the X1 output along lead 48. The multivibrator 46 provides a reference square wave of width correlating to the predetermined high speed to which acceleration time is being measured, e.g., 70 mph. When the wheel speed just exceeds that of the predetermined upper speed, the NAND-gate 47 furnishes a pulse via lead 49 and switch 34 to reset flip-flop 33 and inhibit flip-flop 36. The counter and display 38 now registers the time required for the vehicle to accelerate from the prescribed low to high speeds, say, 25–70 mph.

The 0–60 mph operation is actually a special case of the $\Delta$-mode in which the "low" speed is zero mph. The first step is to adjust the multivibrator 46 to provide a pulse of width corresponding to 60 mph and then switches 30 and 34 are transferred to the 0–60 position.

Since the 0–60 point of switch 30 is common with the ¼-MILE point, initiation of clock pulse counting is the same as described in the ¼-MILE, i.e., as soon as a magnet 10, 11 moves past sensor coil 19. Cessation of clock pulse counting occurs in the same way as described in connection with $\Delta$-mode operation, since the NAND-gate 49 signal output energizes flip-flop 33 through 0–60 points which are common with the $\Delta$ points of switch 34. Accordingly, the time for moving from a standing start to 60 mph is now registered at 38.

What is claimed is:

1. Apparatus for timing a vehicle having a wheel which rotates on movement of the vehicle, comprising:
   means carried by the vehicle for producing at least one signal for each revolution of the wheel;
   a continuously running clock pulse generator;
   a counter and display means;
   selectively actuatable switching means interconnecting the clock pulse generator and the counter and display means;
   circuit means connected to receive the signal from said means carried by the vehicle for producing a square wave pulse of width inversely related to the vehicle speed;
   a square wave generator for producing a pulse of selectively variable width;
   a comparator connected to receive the square wave signal from the generator and the square wave pulse of width dependent upon vehicle speed and producing a signal when said pulse dependent upon vehicle speed achieves a width less than that of said generator;
   means interconnecting the comparator and the switching means for initiating clock pulse counting when the comparator produces an output signal;
   a second square wave generator for producing a selectively variable width pulse;
   a second comparator fed by the second square wave generator pulse output and the pulse output of the means dependent upon vehicle speed to produce a pulse when said speed dependent pulse is less than the second generator pulse width; and
   means interconnecting the second comparator to the switching means for inhibiting clock pulse counting when the vehicle speed dependent pulse has a width less than the width of the second pulse generator.

2. A vehicle acceleration timer said vehicle having a wheel which rotates during movement of the vehicle, comprising:
   means for producing at least one pulse for each revolution of the vehicle wheel during movement thereof;
   a clock pulse generator which is continuously running;
   a counter and display means;
   means interconnecting the clock pulse generator and counter and display means which is selectively actuatable to a counting or no-counting condition;
   a first circuit interconnecting the means for producing a pulse on wheel rotation with the means interconnecting the clock pulse generator and counter and display means for actuating the counter and display means to a counting condition; and second means responsive to signals produced by the wheel rotation to produce a signal at a predetermined velocity, said latter means being interconnected with the means interconnecting the clock pulse generator and counter and display means to inhibit the same and stop clock pulse counting, whereby the counter and display means registers the elapsed time for the vehicle to accelerate from zero speed to a predetermined speed;

said second means including a one-shot multivibrator connected to the means for producing a pulse for each revolution of a vehicle wheel and actuated by the pulse therefrom, a NAND-gate, means interconnecting the input of said NAND-gate with the pulse from said means for producing a pulse on wheel revolution and the output of said multivibrator, and means connecting the NAND-gate output to the means interconnecting the clock pulse generator and counter and display means for actuating the latter means to a no-count condition when the NAND-gate output provides a signal.

3. A system for providing the elapsed time for a wheeled vehicle to make a traversal, comprising:

at least one magnet means mounted on a vehicle wheel;

a coil carried by the vehicle at a point where the magnet means will induce a signal in said coil each time the wheel rotates;

a binary counter actuated by signals induced in the coil, and having a first stage providing pulse output signals the width of which pulses are functionally related to the vehicle speed;

a clock pulse generator;

time registering means;

circuit means interconnecting the clock pulse generator and the registering means;

a first switching circuit interconnecting the coil and the circuit means and selectively adjustable to initiate counting of clock pulses on the first wheel rotation; and a second switching circuit interconnecting the binary counter first stage pulse output and the first switching circuit including a selectively variable width square wave generator, a comparison circuit fed by the binary counter first stage output and the square wave generator, said comparison circuit providing an output signal when the binary counter first stage pulse has a width less than that of the square waves, said comparison circuit output being connected to said circuit means for inhibiting said circuit means and stopping clock pulse accumulation by the registering means on generation of a counter first stage output pulse of width less than that of the square wave generator.

4. A system for measuring elapsed time of an automobile to move from a first point to a second point, comprising:

a permanent magnet fixedly mounted to the inside surface of a steerable wheel of the automobile;

a magnetic sensor mounted on the steering arm of said wheel such that on each revolution of said wheel the magnet is moved past the sensor inducing an electric signal therein;

pulse generating means connected to said sensor for producing a pulse each time an electric signal is produced in said sensor;

a binary counter circuit having an input connected to the pulse generating means for accumulating a pulse count therein, and an output;

a decoding network connected to the output of said counter circuit and selectively adjustable to provide an output signal at a predetermined accumulated count in said counter corresponding to rotation of said steerable wheel from the first point to the second point;

digital time display means mounted within the automobile for direct viewing by the automobile driver;

a free-running electrical pulse generator;

first flip-flop means interconnecting the free-running pulse generator and the digital time display means for providing actuating signals to said digital time display means corresponding to the pulses of said free-running pulse generator, said flip-flop means including an inhibit terminal; and second flip-flop means interconnecting said pulse generating means and said first flip-flop means for enabling said first flip-flop means to provide pulses to said display means on the first signal by said sensor, said second flip-flop means being interconnected with said decoding network to provide an inhibit signal to said first flip-flop means on production of an output signal by said decoding network.

5. A system for measuring elapsed time of an automobile as in claim 4, in which said binary counter circuit means has separate connections from each of its stages to the decoding means, and there are further provided means for selectively establishing or disestablishing connection therebetween to compensate for changes in wheel diameter.

6. A system for measuring elapsed time of an automobile to move from a first point to a second point, comprising:

a permanent magnet fixedly mounted to the inside surface of a steerable wheel of the automobile;

a magnetic sensor mounted on the steering arm of said wheel such that on each revolution of said wheel the magnet is moved past the sensor inducing an electric signal therein;

pulse generating means connected to said sensor for producing a pulse each time an electric signal is produced in said sensor;

a binary counter circuit having an input connected to the pulse generating means for accumulating a pulse count therein, and an output;

decoding means connected to the output of said counter circuit for providing an output signal at a predetermined accumulated count in said counter corresponding to rotation of said steerable wheel from the first point to the second point;

digital time display means mounted within the automobile;

a free-running electrical pulse generator;

first circuit means interconnecting the free-running pulse generator and the digital time display means for providing actuating signals to said digital time display means corresponding to the pulses of said free-running pulse generator, said first circuit means including an inhibit terminal; and second circuit means interconnecting said pulse generating means and said first circuit means for actuating said first circuit means to provide pulses to said display means on the first signal by said sensor, said second circuit means being interconnected with said decoding means to provide an inhibit signal to said first circuit means on production of an output signal by said decoding means.

* * * * *